United States Patent [19]

Davis et al.

[11] Patent Number: 5,353,944

[45] Date of Patent: Oct. 11, 1994

[54] NON-METALLIC HATCH APPARATUS

[75] Inventors: Gail F. Davis; James F. Matthews, both of Duncan, Okla.

[73] Assignee: Halliburton Company, Duncan, Okla.

[21] Appl. No.: 932,388

[22] Filed: Aug. 19, 1992

[51] Int. Cl.⁵ .......................................... B65D 51/16
[52] U.S. Cl. .................................. 220/303; 220/254;
220/284; 220/304; 220/326; 220/366; 220/367;
220/375; 220/601
[58] Field of Search ............... 220/231, 254, 284, 286,
220/303, 304, 326, 327, 328, 366, 367, 375, 601,
89.1; 215/307

[56] References Cited

U.S. PATENT DOCUMENTS

| | | | |
|---|---|---|---|
| 1,232,788 | 7/1917 | Gibson | 220/284 |
| 2,004,997 | 6/1935 | McCabe | 220/304 X |
| 2,760,343 | 8/1956 | Reed | 220/89.1 X |
| 2,843,290 | 7/1958 | Hooper . | |
| 2,962,185 | 11/1960 | Starr et al. | 220/254 |
| 3,058,527 | 10/1962 | Dennis et al. | 220/231 X |
| 3,380,618 | 4/1968 | Phillips . | |
| 3,393,824 | 7/1968 | Appleton . | |
| 3,470,927 | 10/1969 | Craig . | |
| 3,615,036 | 10/1971 | Mross | 220/304 X |
| 4,005,799 | 2/1977 | Mannaerts . | |
| 4,195,750 | 4/1980 | Fee . | |
| 4,245,754 | 1/1981 | Ellis . | |
| 4,252,249 | 2/1981 | Beckhardt et al. . | |
| 4,382,521 | 5/1983 | Ostrowsky | 215/307 |
| 4,384,655 | 5/1983 | Kendall | 220/316 |
| 4,512,499 | 4/1985 | Uuskallio . | |
| 4,576,308 | 3/1986 | Sullivan . | |
| 4,706,841 | 11/1987 | Grajek | 220/375 |
| 4,785,963 | 11/1988 | Magley | 220/266 |
| 5,111,955 | 5/1992 | Baker et al. . | |
| 5,158,204 | 10/1992 | Martrich et al. | 220/727 |
| 5,172,584 | 12/1992 | Thomas | 220/565 X |
| 5,211,304 | 5/1993 | Stolzman | 220/304 |

OTHER PUBLICATIONS

Exhibits A, B, and C relate to a Clay & Bailey Model 1890 Manway hatch.
Exhibit D is a brochure provided by Poly Processing Company entitled *Transtore Tanks Series II* dated Jun. 1, 1988.
Exhibit E is a photograph of a threaded hatch opening and cover associated with the Poly Processing tank described in Exhibit D.
Exhibit F is a brochure provided by Bonar Plastics entitled *Bonar Plastics Poly Payloader* ®.
Exhibit G is a photograph of a threaded access opening and cover associated with the Bonar Plastics device described in Exhibit F.

*Primary Examiner*—Allan N. Shoap
*Assistant Examiner*—Stephen Cronin
*Attorney, Agent, or Firm*—James R. Duzan; Dennis D. Brown

[57] ABSTRACT

The present invention provides a hatch apparatus comprising: (a) a non-metallic base having a base flange which is connectable to a container flange by bolting and (b) a non-metallic lid which is threadedly connectable to the non-metallic base. The inventive hatch apparatus can also include a pressure relief device associatable with the non-metallic lid. In one embodiment, the non-metallic lid comprises a single lid member. In a second embodiment, the non-metallic lid comprises two lid members. The inventive hatch apparatus is highly corrosion resistant and convenient to use.

29 Claims, 10 Drawing Sheets

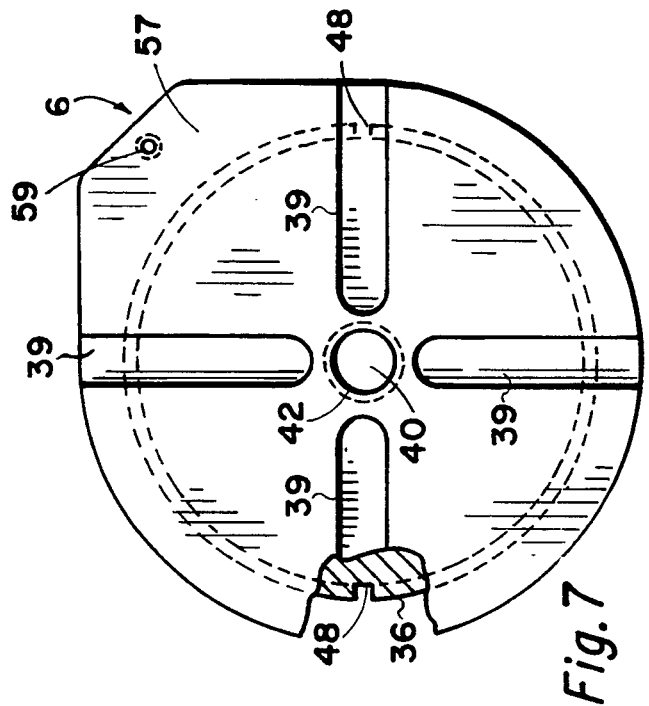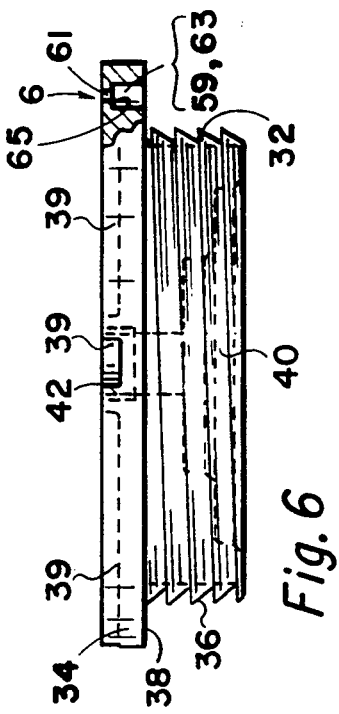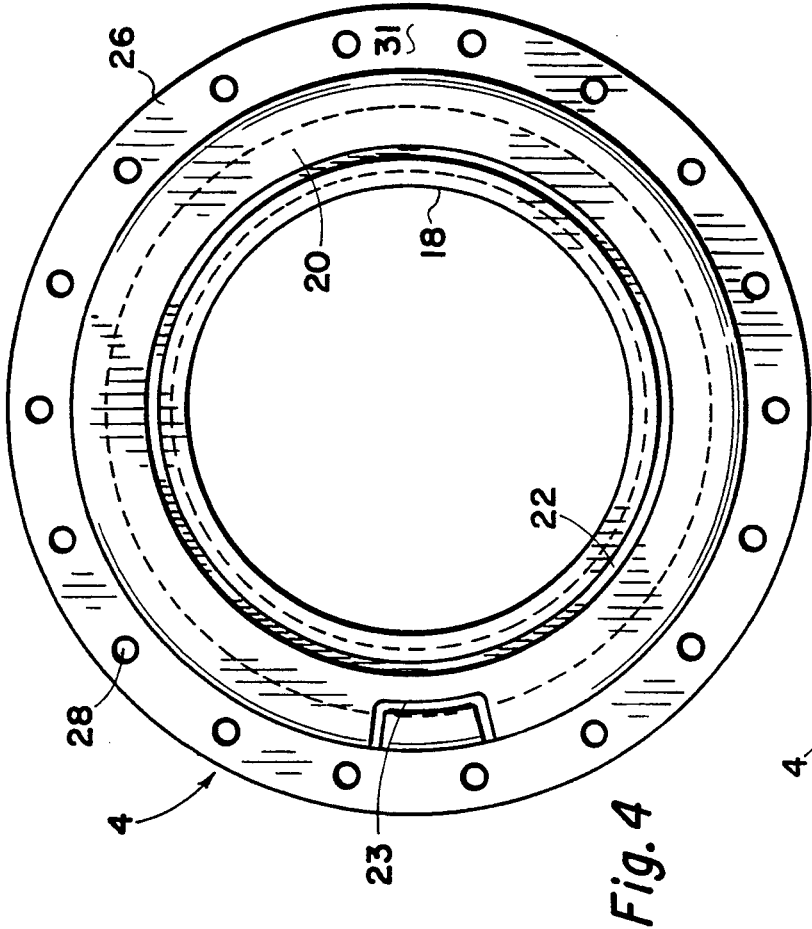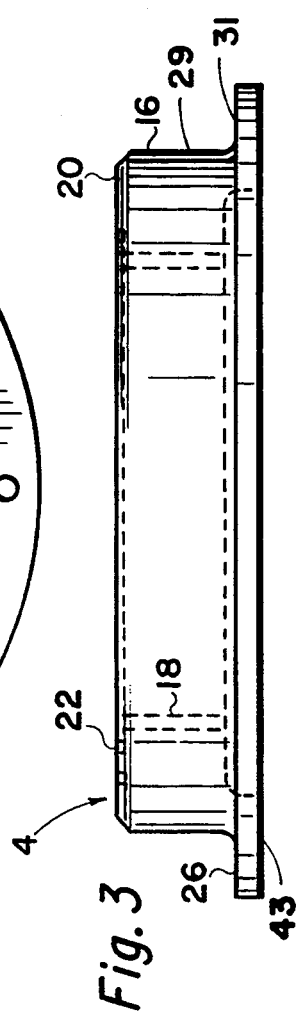

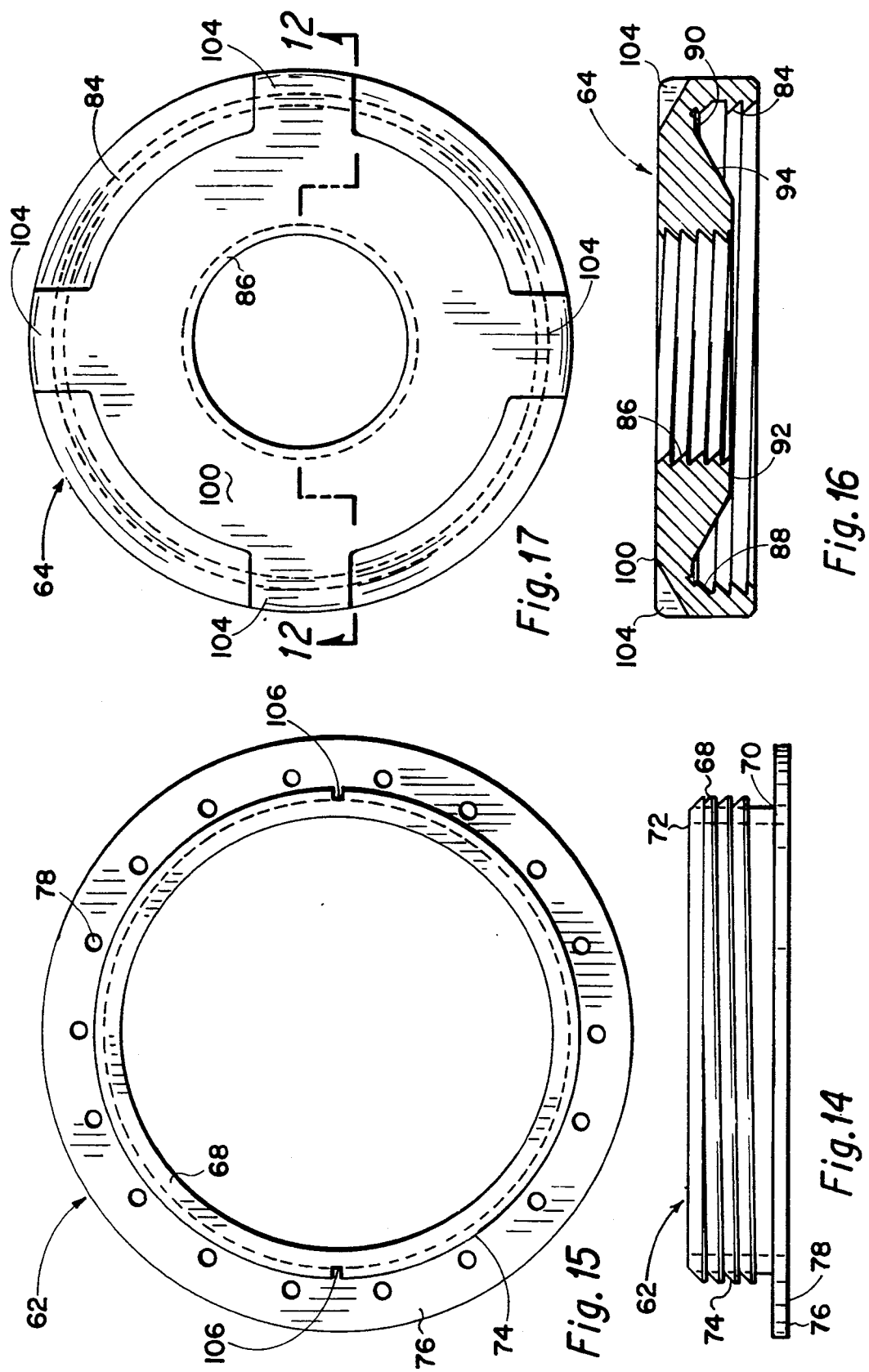

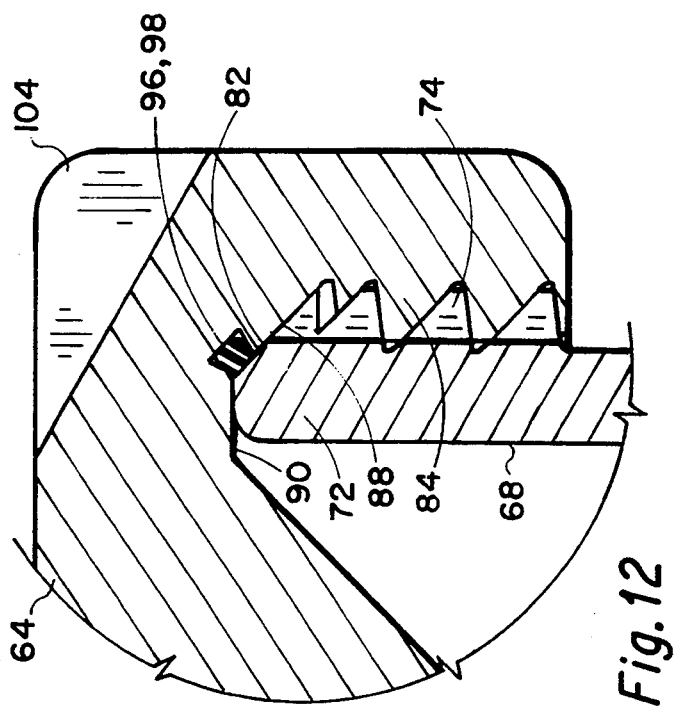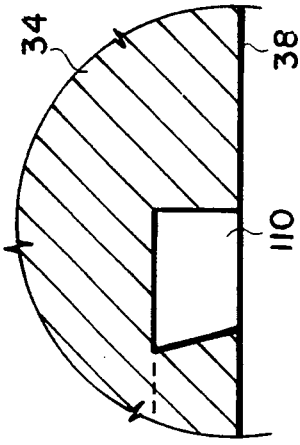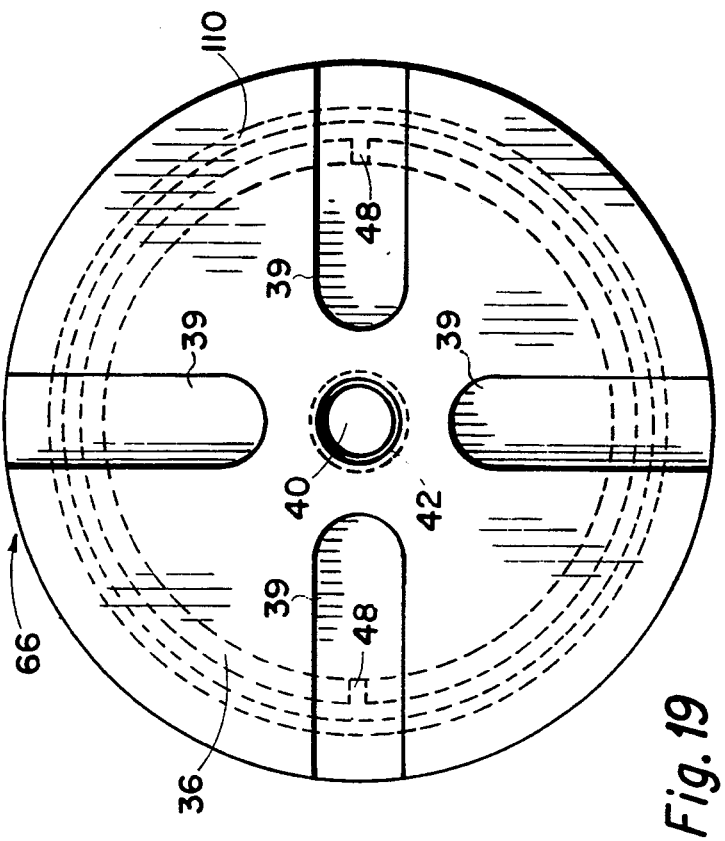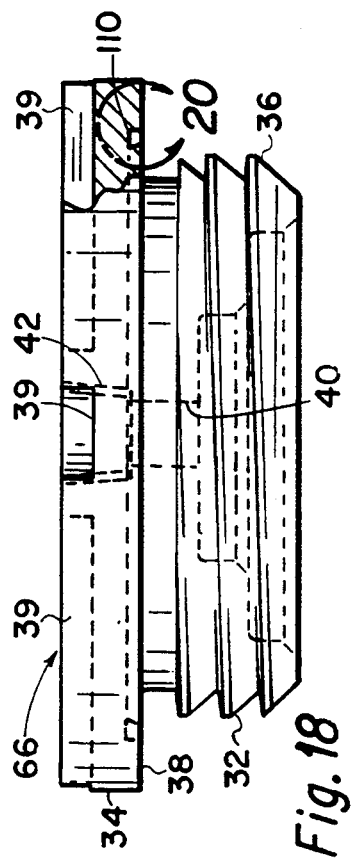

though the hazardous nature of these fluids, great care must be taken when transporting them over the public highways. Numerous regulations are in effect regarding the transport of such materials.

NON-METALLIC HATCH APPARATUS

FIELD OF THE INVENTION

The present invention relates generally to closure devices for containers. More particularly, but not by way of limitation, the present invention relates to manway hatches suitable for use in corrosive service.

BACKGROUND OF THE INVENTION

A number of oilfield operations utilize corrosive fluids (e.g., acids) which must be transported to the well site in substantial volumes. Due to the hazardous nature of these fluids, great care must be taken when transporting them over the public highways. Numerous regulations are in effect regarding the transport of such materials.

Typically, corrosive fluids used in servicing oil wells are transported in metal tanks carried on trucks or trailers. These tanks typically have manways formed therein which are surrounded by bolted flanges. These manways are typically closed using metal manway covers such as the Model 1890 manway cover sold by Clay & Bailey. The Clay & Bailey Model 1890 manway cover meets the requirements of Department of Transportation (DOT) specification 412 at a test pressure of 36 psi.

The Clay & Bailey Model 1890 manway cover includes a base portion having a flange adapted to be bolted to the flange surrounding the manway of a fluid tank. A metal cover is connected to the base portion of the Clay & Bailey apparatus by a hinge. A plurality of cam locking arms fold over the metal cover when it is in a closed position, thus locking the metal cover in place. The inner surface of the Clay & Bailey manway cover may be lined in order to protect the cover from corrosion. However, this corrosion-resistant liner is susceptible to being torn away from the manway cover or otherwise damaged. Moreover, the Model 1890 manway cover includes numerous intricately shaped exterior metal components, such as cams, latches, pins and the like, which are susceptible to corrosion.

Non-metallic containers, such as those sold by Poly Processing Company of Monroe, La. under the designation TRANSTORE TANKS SERIES II, have also been used for storing and transporting corrosive fluids. The tanks sold by Poly Processing Company are manufactured from high density polyethylene and have integrally molded access openings which include female threads for threadingly receiving male threaded cover plugs. These male threaded cover plugs have hammer lugs formed therein.

Non-metallic tanks for storing and transporting corrosive fluids have also been sold by Bonar Plastics under the designation POLY PAYLOADER®. Each of these containers has an integrally molded neck opening with external male threads defined thereon. A molded non-metallic cap screws onto the threaded neck to close the neck opening.

Neither the TRANSTORE TANKS SERIES II tanks nor the POLY PAYLOADER® tanks just described meet the requirements of DOT specification 412 at a test pressure of 36 psi. Rather, these tanks meet only the requirements of DOT specification 57 at a test pressure of 15 psi.

U.S. Pat. No. 5,111,955 discloses a non-metallic hatch designed for use on an acid tank. The non-metallic hatch of U.S. Pat. No. 5,111,955 meets the requirements of DOT 412 at a test pressure of 36 psi. The non-metallic hatch includes a base and a lid. The base includes a base flange which is complementary to, and is constructed to be bolted to, an acid tank manway flange. The base also has an opening defined therethrough and includes a male threaded portion which surrounds the opening. The hatch lid has a female threaded portion thereon which is complementary to the male threaded portion of the base so that the lid can be threadedly engaged with the base in order to close the acid tank manway.

SUMMARY OF THE INVENTION

The present invention provides an improved hatch apparatus which is exceptionally well-suited for use on containers used for storing and/or transporting corrosive materials. The inventive hatch apparatus is made of a corrosion resistant plastic material (e.g., ultra-high molecular weight polyethylene) and does not utilize hinges, latches, cams, or linings. The inventive hatch apparatus is interchangeable with conventional metal manway hatches such as the Clay & Bailey Model 1890. Consequently, existing tanks equipped with conventional manway hatches can be easily retrofitted with the inventive hatch apparatus. Additionally, the inventive hatch apparatus meets the requirements of DOT specification 412 at a test pressure of 36 psi. Further, one embodiment of the inventive hatch apparatus will function suitably even when bolted to a distorted container flange.

The inventive hatch apparatus includes a small, convenient, primary opening which can be used for gauging, adding chemicals, viewing circulation, and for generally any other routine, day-to-day tank operation. This primary opening is sealed using a small lid member which is lightweight and easy to operate. By using the small primary opening of the inventive hatch apparatus for routine, day-to-day operations, a substantial safety improvement is also realized since tank operators cannot accidentally fall through the small primary opening.

The present invention provides a hatch apparatus for a container, said container having a container opening defined therein with a container flange surrounding the container opening. The inventive hatch apparatus comprises a non-metallic base and a non-metallic lid. The non-metallic base comprises: a collar having a passageway extending therethrough; a threaded cylindrical bore defining at least a portion of the collar passageway and having an inside diameter $D_1$; and a base flange connected to the collar and having an inside diameter $D_3$. The non-metallic lid includes a male threaded portion which is threadedly receivable in the threaded cylindrical bore of the base. The base flange is complementary to the container flange such that the base flange can be sealingly bolted to the container flange. Further, the radial thickness of the collar is substantially greater than the thickness of the connection between the collar and the base flange and the inside diameter $D_3$ of the base flange is substantially greater than the inside diameter $D_1$ of the threaded cylindrical bore of the collar such that, when the container flange is an uneven container flange, the base flange can be sealingly bolted to the container flange without causing the threaded cylindrical bore to be pulled substantially out-of-round.

The present invention also provides a hatch apparatus comprising: a non-metallic base; a non-metallic lid; and a pressure relief means. The non-metallic base is connectable to a container flange by bolting. The base has a passageway extending therethrough such that, when the base is connected to the container flange, the base passageway is placed in communication with the container opening. The base also includes a female threaded portion inside the base passageway. The non-metallic lid includes a male threaded portion which is threadedly receivable in the female threaded portion of the base. The lid also has a lid passageway extending therethrough. The male threaded portion of the lid surrounds at least a portion of the lid passageway such that, when the male threaded portion of the lid is received in the female threaded portion of the base, the lid passageway is placed in communication with the base passageway. The pressure relief means is associatable with the lid passageway and is operable for relieving a pressure differential between the interior and the exterior of the container.

In a third embodiment, the inventive hatch apparatus comprises: a base which is connectable to a container flange by bolting; a first lid member; and a second lid member. The base has a base passageway extending therethrough such that, when the base is connected to the container flange, the base passageway is placed in communication with the container opening. The base also includes a base threaded portion surrounding at least a portion of the base passageway. The first lid member includes a large diameter threaded portion complementary to the base threaded portion such that the first lid member can be threadedly connected to the base. The first lid member also has a first lid member passageway extending therethrough. At least a portion of the first lid member passageway is surrounded by the large diameter threaded portion of the first lid member such that, when the first lid member is threadedly connected to the base, the first lid member passageway is placed in communication with the base passageway. The first lid member further includes a small diameter threaded portion surrounding at least a portion of the first lid member passageway. The second lid member includes a large diameter threaded portion which is complementary to the small diameter threaded portion of the first lid member such that the second lid member can be threadedly connected to the first lid member.

The preferred base used in the third embodiment of the inventive hatch apparatus is non-metallic and includes a cylindrical collar having an axial first end and an axial second end. The preferred base also has a base passageway extending therethrough from the axial first end to the axial second end. Additionally, the preferred base includes a radial, outwardly extending base flange adjacent the axial first end of the cylindrical collar which is complementary to the container flange such that the base flange can be bolted to the container flange. The preferred base further includes a male threaded portion on the exterior of the cylindrical collar.

The preferred first lid member used in the third embodiment of the inventive hatch apparatus is a non-metallic member having a passageway extending therethrough. The passageway of the preferred first lid member has a first threaded cylindrical bore formed therein which is complementary to the male threaded portion of the collar of the preferred base such that the preferred first lid member can be threadedly connected to the preferred base. The passageway of the preferred first lid member also includes a second threaded cylindrical bore having an inside diameter which is smaller than the inside diameter of the first threaded cylindrical bore of the preferred first lid member.

The preferred second lid member used in the third embodiment of the inventive apparatus is a non-metallic member which includes a cylindrical male threaded portion. The cylindrical male threaded portion of the preferred second lid member is complementary to the second threaded cylindrical bore of the preferred first lid member such that the preferred second lid member can be threadedly connected to the preferred first lid member.

Numerous other objects, features, and advantages of the present invention will be readily apparent to those skilled in the art upon reference to the accompanying drawings and upon reading the following description of the preferred embodiments.

DESCRIPTION OF THE DRAWINGS

FIG. 3 is a side view of base 4 of hatch apparatus 2.

FIG. 4 is a top view of base 4.

FIG. 6 is a side view of lid 6 of hatch apparatus 2.

FIG. 7 is a partially cutaway top view of lid 6 of hatch apparatus 2.

FIG. 12 is an enlarged view of section 12 identified in FIG. 11.

FIG. 14 is a side view of base 62 of hatch apparatus 60.

FIG. 15 is a top view of base 62.

FIG. 16 is a cutaway side view of first lid member 64 of hatch apparatus 60.

FIG. 17 is a top view of first lid member 64.

FIG. 18 is a partially cutaway side view of second lid member 66 of hatch apparatus 60.

FIG. 19 is a top view of second lid member 66.

FIG. 20 is an enlarged view of groove 110 of second lid member 66.

DESCRIPTION OF THE PREFERRED EMBODIMENTS

Figure 1:
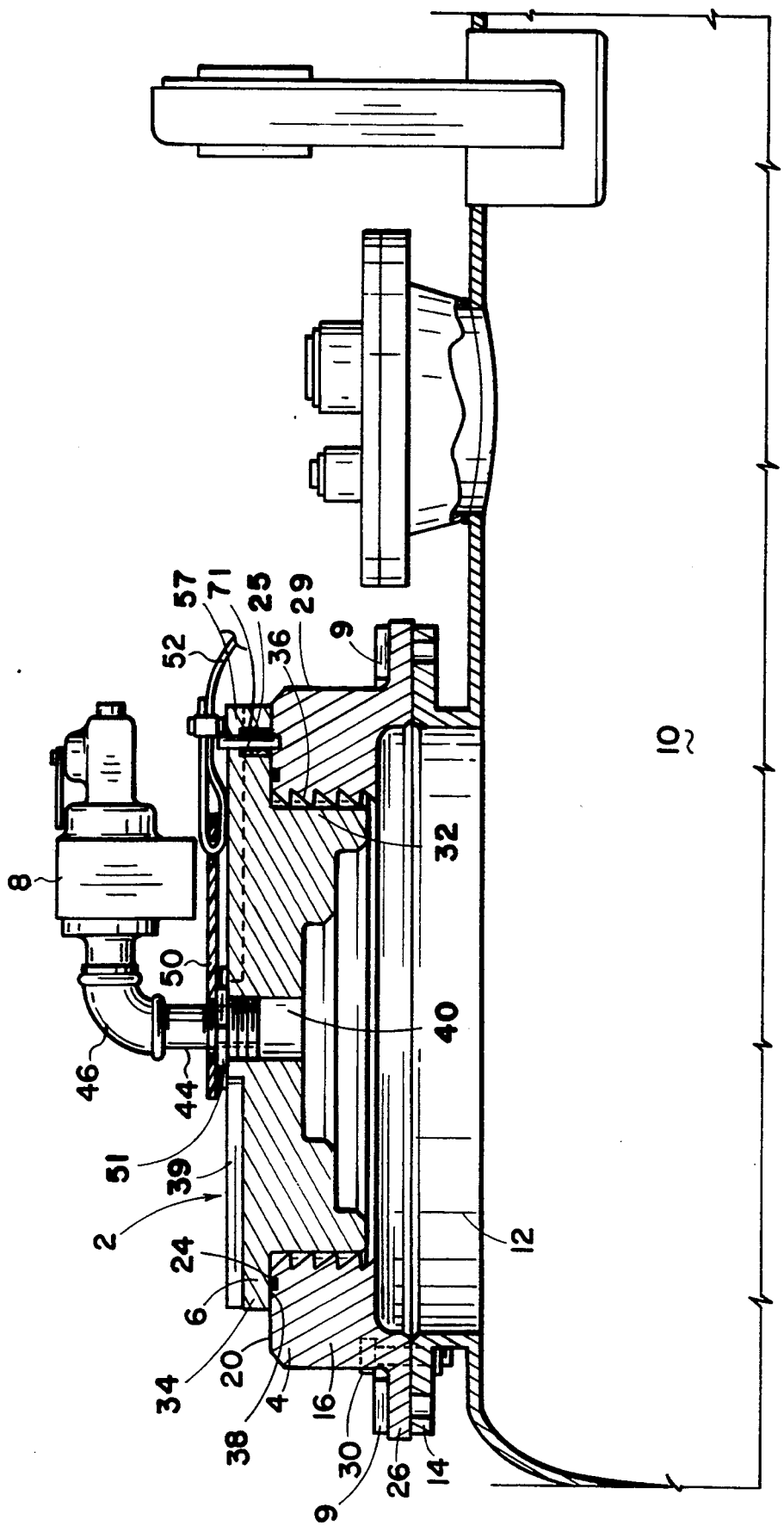
FIG. 1 is a cutaway side view of a hatch apparatus 2 provided by the present invention.

A first embodiment 2 of the hatch apparatus of the present invention is depicted in FIGS. 1–10. Hatch apparatus 2 comprises a base 4 and a lid 6 or 7 which is threadedly connectable to base 4. Hatch apparatus 2 can also include a pressure relief valve 8. As indicated in FIG. 1, hatch apparatus 2 is well-suited for use as a manway hatch on a container 10 having a container flange 14 surrounding a container opening 12. Base 4, lid 6, and alternative lid 7 of hatch apparatus 2 are preferably each composed of a non-metallic corrosion-resistant material. Most preferably, base 4 and lids 6 and 7 are composed of ultra-high molecular weight polyethylene.

Base 4 of hatch apparatus 2 includes a cylindrical collar 16 having a cylindrical threaded bore 18 extending therethrough. Collar 16 has a radial upper surface 20 with a circular groove 22 formed therein for receiving an O-ring 24. Radial upper surface 20 also has a groove 23 formed therein for receiving the end of a locking pin 25 from lid 6. When locking pin 25 is received in groove 23, lid 6 is prevented from being threadedly disconnected from base 4. Base 4 further includes a base flange 26 having bolting holes 28 formed therein. Base flange 26 is complementary to container flange 14 such that base flange 26 can be bolted to container flange 14 using bolts 30 and backing brackets 9.

Base 4 is advantageously constructed such that base flange 26 can be sealingly bolted to a distorted (i.e., uneven) container flange 14 without causing cylindrical threaded bore 18 of collar 16 to be pulled out-of-round. Consequently, when base flange 26 is bolted to a distorted container flange 14, the female threads of collar 16 remain substantially even such that lid 6 can be threadedly connected to and disconnected from base 4.

Figure 5:
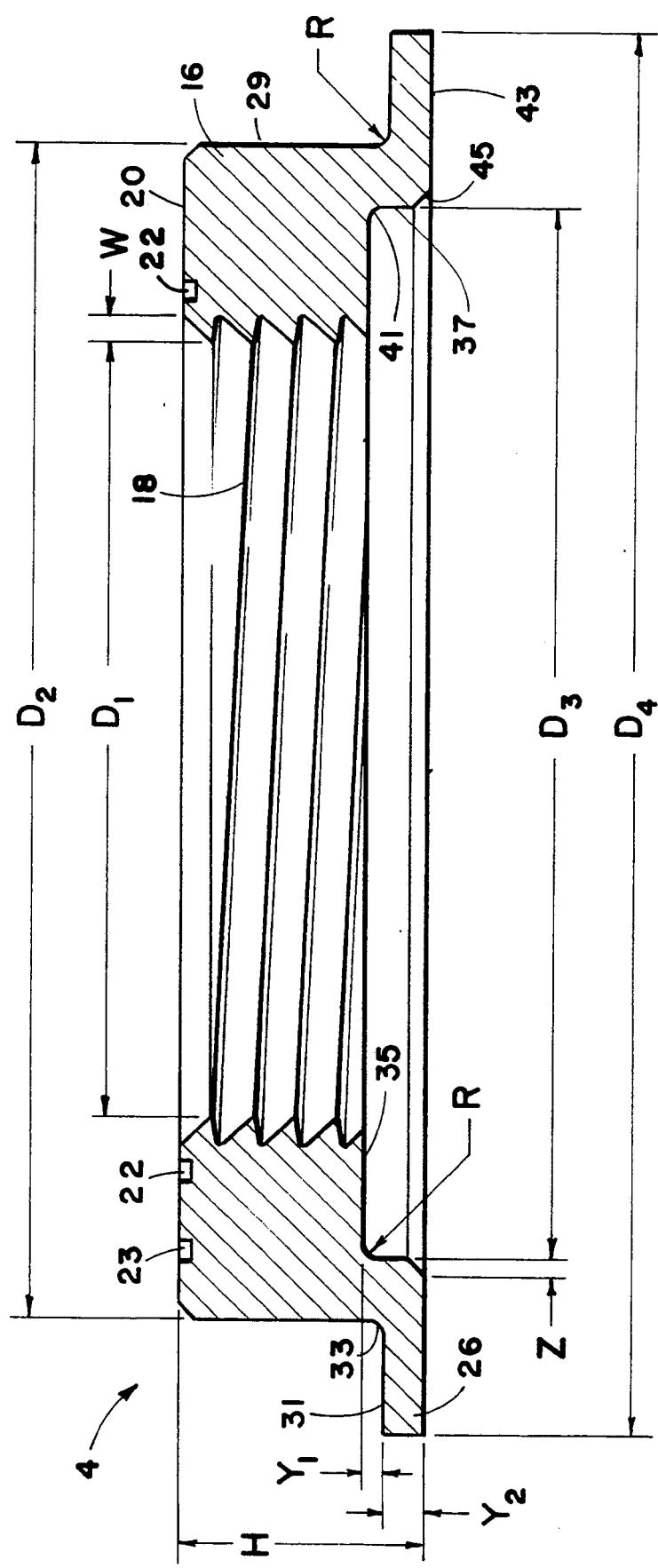
FIG. 5 is a cutaway side view of base 4.

In order to allow base flange 26 to be sealingly bolted to a distorted container flange without causing cylindrical threaded bore 18 of base collar 16 to be pulled out-of-round, base 4 is constructed such that (a) the radial thickness of collar 16 is substantially greater than the radial thickness of the connection between collar 16 and flange 26 and (b) the inside diameter of collar 16 is substantially less than the inside diameter of base flange 26. Specifically, as shown in FIG. 5, base 4 preferably comprises: an exterior cylindrical surface 29; a radial upper flange surface 31; a curved surface 33 extending between the lower end of exterior cylindrical surface 29 and the inner edge of radial upper flange surface 31; a radial inner surface 35 extending outwardly from the lower end of cylindrical threaded bore 18; a lower cylindrical bore 37; a curved surface 41 extending between the outer edge of radial inner surface 35 and the upper end of cylindrical bore 37; a radial lower flange surface 43; and a chamfered surface 45 extending downwardly and outwardly from the lower end of cylindrical bore 37 to the inner edge of radial lower flange surface 43. As also shown in FIG. 5: the inside diameter $D_1$ of threaded bore 18 of collar 16 is substantially less than the outside diameter $D_2$ of exterior cylindrical surface 29. Additionally, the inside diameter $D_3$ of lower cylindrical bore 37 is less than $D_2$ but is substantially greater than $D_1$. Further, a gap $Y_1$ preferably exists between radial upper flange surface 31 and radial inner surface 35.

In a preferred embodiment of hatch apparatus 2, $D_1$ is not more than about 75% of $D_2$, $D_1$ is not more than about 85% of $D_3$, $Y_1$ is in the range of from 0 to about 1.0 inches, and flange 26 has a thickness ($Y_2$) of not greater than about 1.5 inches. Most preferably, $D_1$ is in the range of from about 60% to about 70% of $D_2$, $D_1$ is in the range of from about 68% to about 78% of $D_3$, and $Y_2$ is not greater than about 1.0 inches. Further, $Y_1$ is most preferably in the range of from about 0.1 to about 0.75 inches.

In a particularly preferred embodiment of hatch apparatus 2 wherein hatch apparatus 2 is sized to be bolted to a standard 18 inch manway flange, $D_1$=about 12.4 inches, $D_2$=about 19.0 inches, $D_3$=about 17.0 inches, $Y_1$=about 0.37 inches, and $Y_2$=about 0.63 inches. Additionally, in this particularly preferred embodiment, the female threads of base 4 have a thread width (W) of about 0.442 inches, curved surfaces 33 and 41 each have a radius of curvature (R) of about 0.25 inches, chamfered surface 45 is chamfered at an angle of about 45°, chamfered surface 45 has a dimension (Z) of about 0.25 inches, base 4 has an overall height (H) of about 4.0 inches, and the outside diameter ($D_4$) of base flange 26 is about 22.75 inches.

Lid 6 comprises a lower cylindrical portion 32 and an upper portion 34 adjacent lower cylindrical portion 32. Lower cylindrical portion 32 includes a male threaded portion 36 which is threadedly receivable in threaded bore 18 of base 4 for connecting lid 6 to base 4. Upper portion 34 includes a lower radial surface 38 which extends outwardly from the axial upper end of lower cylindrical portion 32. When male threaded portion 36 of lid 6 is threadedly received in bore 18 of base 4, lower radial surface 38 abuts radial upper surface 20 of base 4 such that 0-ring 24 seals the threaded connection between lid 6 and base 4. Preferably, at least one tool groove 39 is formed on upper cylindrical portion 34 of lid 6 to facilitate the threaded attachment of lid 6 to, and the removal of lid 6 from, base 4.

Figure 2:
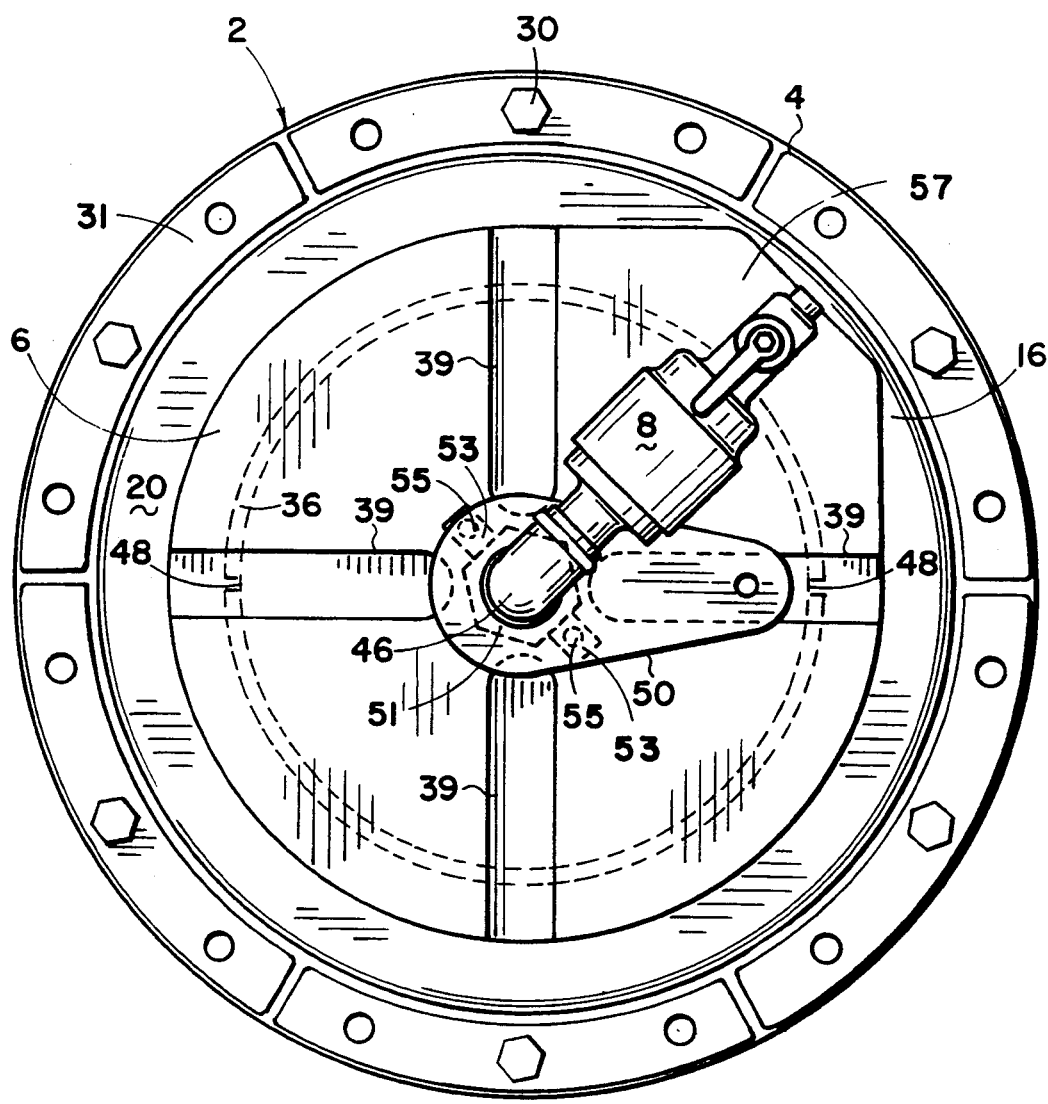
FIG. 2 is a top view of hatch apparatus 2.

A relief bore 40 preferably extends through lid 6 of hatch apparatus 2. Relief bore 40 preferably includes a female threaded portion 42. As shown in FIGS. 1 and 2, a bushing 51 having exterior and interior threads is preferably screwed into female threaded portion 42 of relief bore 40. The threaded connection between bushing 51 and threaded portion 42 is preferably sealed using a chemical sealant. Bushing 51 also includes ears 53 having holes extending therethrough for locking bushing 51 in place in lid 6 using screws 55.

A pressure relief valve 8 can be associated with relief bore 40 of lid 6 for relieving a pressure differential between the interior and the exterior of container 10. In hatch apparatus 2 depicted in FIGS. 1 and 2, relief valve 8 is associated with lid 6 using a conduit means comprising a male threaded union 44 and a female threaded elbow 46. Union 44 and elbow 46 are threadedly connected between bushing 51 and relief valve 8.

Examples of pressure relief valves suitable for use in conjunction with the inventive apparatus include the Kunkle Model 912 BFE06-NC one inch brass relief valve and the Kunkle Model 226P-E00-K one inch stainless steel relief valve.

Upper portion 34 of lid 6 also preferably includes an outward extension 57 having an aperture 59 extending therethrough. Aperture 59 preferably includes: an upper cylindrical bore 61 extending into portion 34 from the upper side of portion 34; a lower cylindrical bore 63 extending from the lower end of bore 61 to lower radial surface 38 of lid portion 34, the cross-sectional diameter of cylindrical bore 63 being larger than the cross-sectional diameter of bore 61; and a radial surface 65 defined by the transition from the lower end of bore 61 to the upper end of bore 63. As depicted in FIG. 1, locking pin 25 extends longitudinally through aperture 59. Additionally, a spring 71 is preferably connected to pin 25 and positioned in lower bore 63 of aperture 59. Spring 71 abuts radial surface 65 of aperture 59 and urges locking pin 25 downward. Consequently, when lid 6 is threadedly connected to base 4, spring 71 urges pin 25 into groove 23 formed in radial upper surface 20 of base 4. Further, spring 71 holds pin 25 in groove 23 such that lid 6 will not become threadedly disconnected from base 4 due to vibration or other forces acting on container 10 while container 10 is being transported.

Hatch apparatus 2 also preferably includes a safety vent means for relieving pressure buildup in container 10 as lid 6 is disconnected from base 4. The safety vent means most preferably comprises at least one vent groove formed across the male threaded portion 36 of lid 6. The safety vent means preferably comprises two vent grooves 48 formed across male threaded portion 36 of lid 6.

As further indicated in FIG. 1, lid 6 of inventive hatch apparatus 2 is preferably tethered to container flange 14 or to some other structure on tank 10 using a non-metallic tether bracket 50 and a tether cord 52. Tying lid 6 to tank 10 in this manner prevents lid 6 from being dropped and/or lost when lid 6 is disconnected from base 4.

Figure 8:
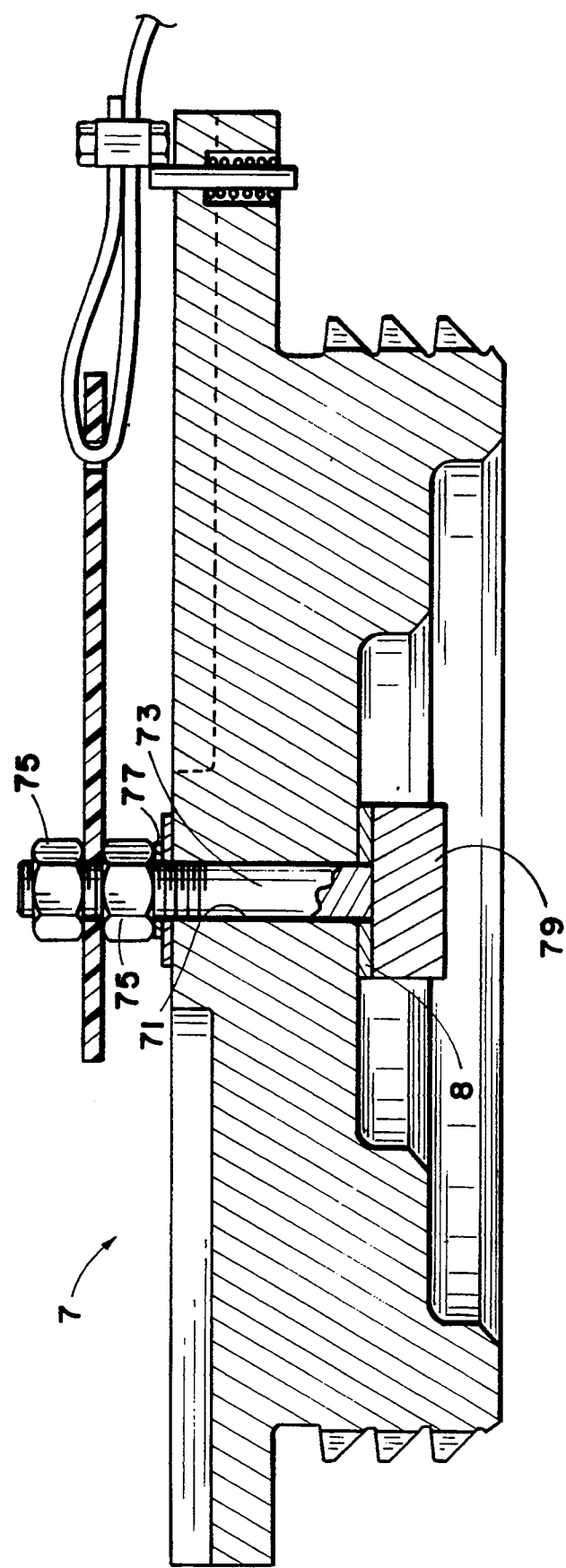
FIG. 8 is a cutaway side view of an alternate lid 7 for hatch apparatus 2.
Figure 9:
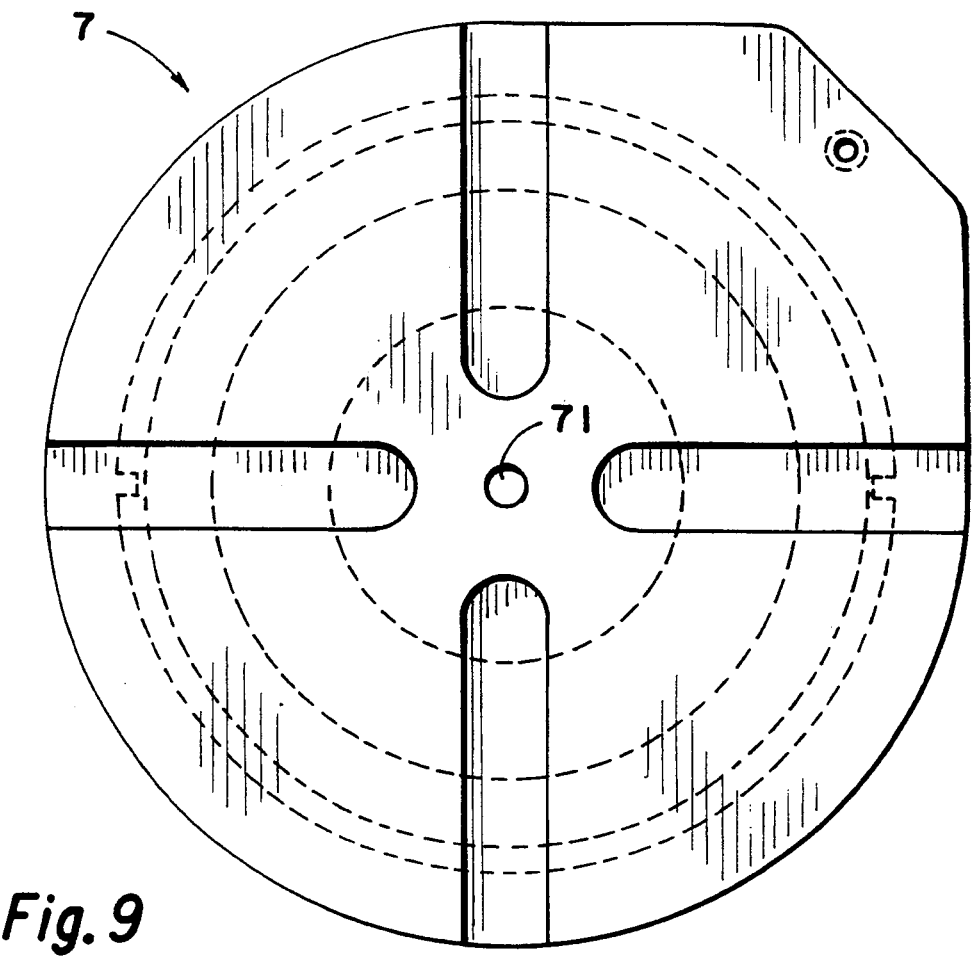
FIG. 9 is a top view of lid 7.
Figure 10:
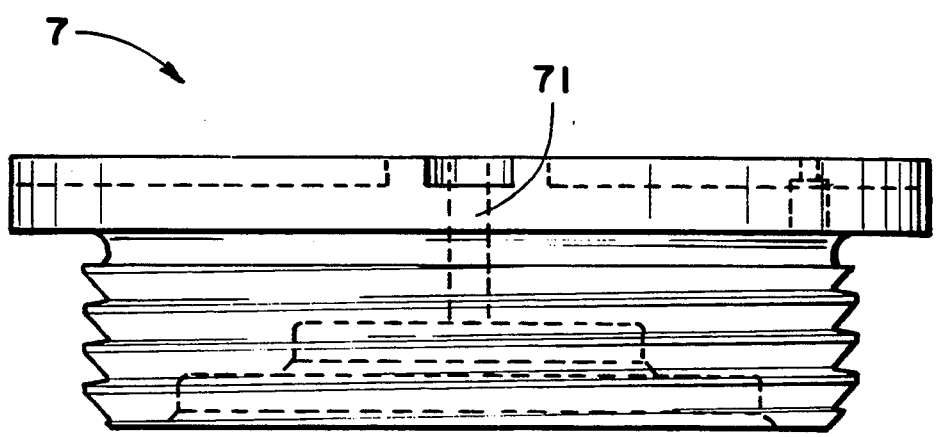
FIG. 10 is a side view of lid 7.
Figure 13:
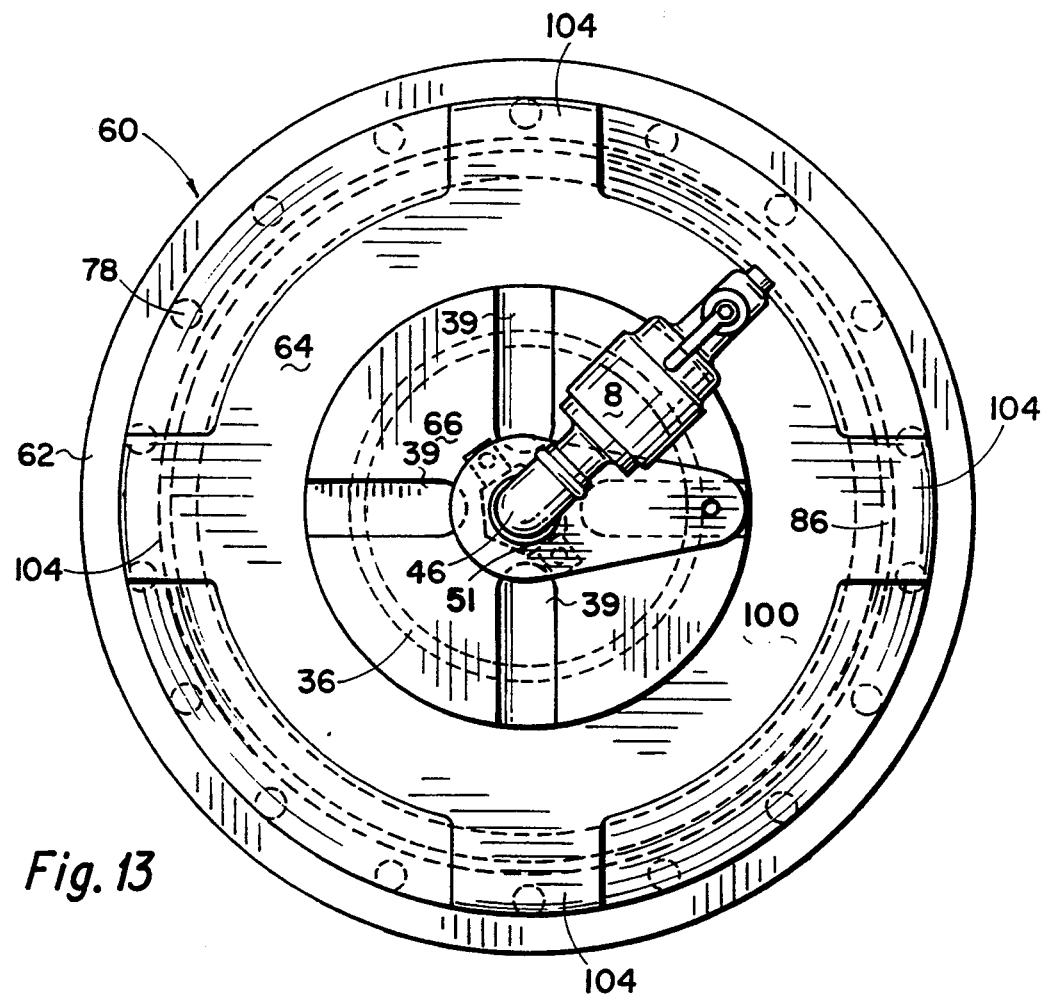
FIG. 13 is a top view of hatch apparatus 60.
Figure 11:
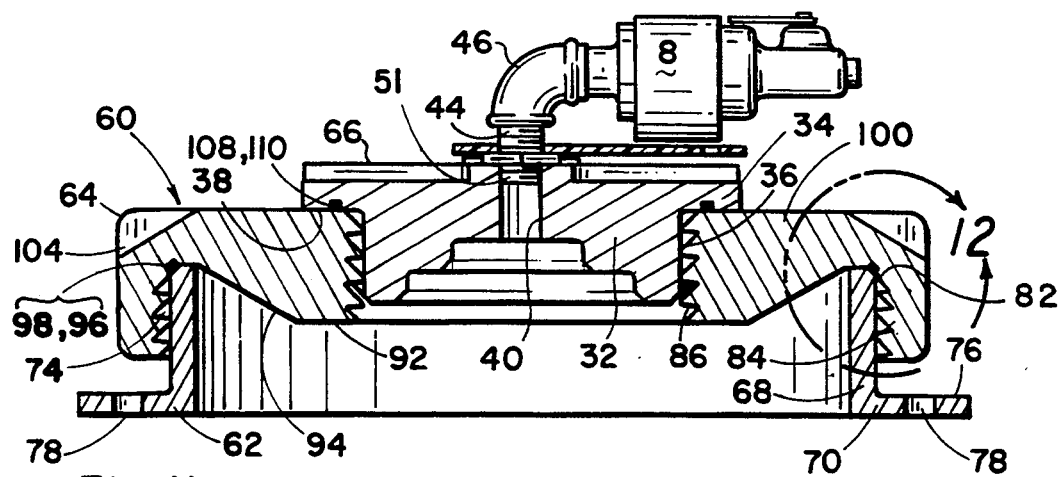
FIG. 11 is a cutaway side view of a hatch apparatus 60 provided by the present invention.

Alternative lid apparatus 7 useful in conjunction with inventive hatch apparatus 2 is depicted in FIGS. 8, 9, and 10. As is apparent, lid apparatus 7 is substantially identical to lid 6 in most respects. However, rather than having a relief bore 40, lid apparatus 7 has a non-threaded cylindrical bore 71 extending therethrough. Additionally, lid apparatus 7 comprises a bolt 73 which extends longitudinally through bore 71 and is held in bore 71 by nuts 75 and washer 77. Bolt 73 has a corrosion resistant head 79 which is positioned inside lid apparatus 7 when bolt 73 is placed in bore 71. Corrosion resistant head 79 is preferably a high density polyethylene encapsulated head. Lid apparatus 7 also preferably comprises a corrosion resistant gasket 8 positioned adjacent head 79 of bolt 73. Gasket 8 is preferably a Viton gasket or a Neoprene gasket.

A second embodiment 60 of the inventive hatch apparatus is depicted in FIGS. 11–23. Hatch apparatus 60 comprises a base 62, a first lid member 64, and a second lid member 66 or 67. Base 62, first lid member 64, and second lid members 66 and 67 are preferably each composed of a non-metallic corrosion-resistant material. Most preferably, base 62, lid member 64, and lid members 66 and 67 are composed of ultra-high molecular weight polyethylene.

Base 62 of inventive hatch apparatus 60 comprises: a cylindrical collar 68 having an axial lower end 70 and an axial upper end 72; a male threaded portion 74 formed on the exterior of collar 68; and a base flange 76 extending radially outward from the axial lower end of collar 68. Base flange 76 is complementary to container flange 14 and has bolting holes 78 formed therein for bolting base 62 to container flange 14. For reasons discussed hereinbelow, base 62 also includes a frusto-conical surface 82 formed at the axial upper end 72 of collar 68.

First lid member 64 of inventive hatch apparatus 60 includes a first threaded cylindrical bore 84 and a second threaded cylindrical bore 86. First threaded bore 84 has a larger inside diameter than second threaded bore 86. Male threaded portion 74 of base 62 is threadedly receivable in first threaded bore 84 such that first lid member 64 can be threadedly connected to base 62. Second threaded bore 86, on the other hand, is sized for threadedly receiving second lid member 66 or 67. The average inside diameter of second threaded bore 86 preferably does not exceed about 80% of the inside diameter of cylindrical collar 68 of base 62. Most preferably, the average inside diameter of second threaded bore 86 does not exceed about 70% of the inside diameter of cylindrical collar 68 of base 62.

The interior of first lid member 64, as generally defined by first threaded bore 84 and second threaded bore 86, comprises: an inverted frusto-conical surface 88 extending inwardly and upwardly from the upper end of first threaded bore 84; a radial surface 90 extending inwardly from the upper edge of inverted frusto-conical surface 88; a radial surface 92 extending outwardly from the lower end of second threaded bore 86; and a frusto-conical surface 94 extending upwardly and outwardly from the outer edge of radial surface 92 to the inner edge of radial surface 90. When male threaded portion 74 of base 62 is completely received in first threaded bore 84 of first lid member 64, inverted frusto-conical surface 88 of lid member 64 abuts frusto-conical surface 82 of base 62. An 0-ring 96 is preferably positioned in a groove 98 formed in frusto-conical surface 88 for sealing the threaded connection between first lid member 64 and base 62. As indicated in FIG. 12, groove 98 preferably has diverging inner walls such that the base of groove 98 is larger than the opening of groove 98.

The exterior of first lid member 64 includes a radial upper surface 100 extending outwardly from the upper end of second threaded bore 86. At least one hammer lug is preferably formed in the upper exterior of first lid member 64 for facilitating the connecting of first lid member 64 to, and the removal of first lid member 64 from, base 62. Most preferably, four hammer lugs 104 are formed in the upper exterior of first lid member 64.

Inventive hatch apparatus 60 also preferably includes a safety vent means for releasing pressure buildup in container 10 as first lid member 64 is disconnected from base 62. This safety vent means preferably includes at least one vent groove formed across either the male threaded portion 74 of base 62 or the first threaded bore 84 of first lid member 64. The safety vent means most preferably includes two vent grooves 106 formed across the male threaded portion 74 of base 62.

In one embodiment, the second lid member used in conjunction with inventive hatch apparatus 60 is second lid member 66 depicted in FIGS. 11, 13, 18, and 19. Second lid member 66 is almost identical to the above-described lid 6 of inventive hatch apparatus 2. Second lid member 66 comprises: a lower cylindrical portion 32; an upper portion 34 adjacent lower cylindrical portion 32; a male threaded portion 36 formed around lower cylindrical portion 32; a lower radial surface 38 extending outwardly from the axial upper end of lower cylindrical portion 32; a relief bore 40 extending through lower cylindrical portion 32 and upper portion 34; a female threaded portion 42 formed in relief bore 40 and extending downwardly from the upper side of second lid member 66; and at least one tool groove 39 formed on the upper side of upper portion 34.

Second lid member 66 can also include a locking arrangement identical to that of lid 6 including: an outward extension of upper portion 34 having an aperture 59 extending therethrough; a locking pin 25; and a locking pin spring 71. If second lid member 66 includes such a locking arrangement, a groove should also be formed in radial upper surface 100 of first lid member 64 for receiving pin 25 when second lid member 66 is threadedly connected to first lid member 64. The groove formed in surface 100 for receiving pin 25 will preferably be substantially identical to groove 23 formed in base 4 of inventive apparatus 2.

Male threaded portion 36 of second lid member 66 is receivable in second threaded cylindrical bore 86 of first lid member 64 such that second lid member 66 can be threadedly connected to first lid member 64. When male threaded portion 36 of second lid member 66 is completely received in second threaded bore 86, lower radial surface 38 of lid member 66 abuts radial upper surface 100 of lid member 64. The threaded connection between second lid member 66 and first lid member 64 is preferably sealed by an 0-ring 108 provided in a groove 110 formed in lower radial surface 38 of second lid member 66. As indicated in FIG. 20, at least one interior wall of groove 110 preferably diverges such that the base of groove 110 is larger than the opening of groove 110.

When second lid member 66 is used in inventive hatch apparatus 60, hatch apparatus 60 preferably includes a pressure relief valve 8 of the type described hereinabove. As was the case with inventive hatch apparatus 2, pressure relief valve 8 can be connected to second lid member 66 using a connecting means including, for example, a bushing 51, a union 44, and an elbow 46.

When second lid member 66 is used in inventive hatch apparatus 60, hatch apparatus 60 also preferably includes a second safety vent means for relieving pressure buildup inside container 10 as second lid member 66 is removed from first lid member 64. This second safety vent means can include at least one vent groove formed across either second threaded bore 86 of first lid member 64 or male threaded portion 36 of second lid member 66. Most preferably, the second safety vent means includes two vent grooves 48 formed across male threaded portion 36 of second lid member 66.

As will be apparent to those skilled in the art, a modified lid apparatus 7 can also be used in inventive hatch apparatus 60 as a substitute for second lid member 66. Modified lid apparatus 7 will essentially be formed by modifying lid apparatus 7 in the same manner that lid member 6 was modified to form second lid member 66.

Figure 23:
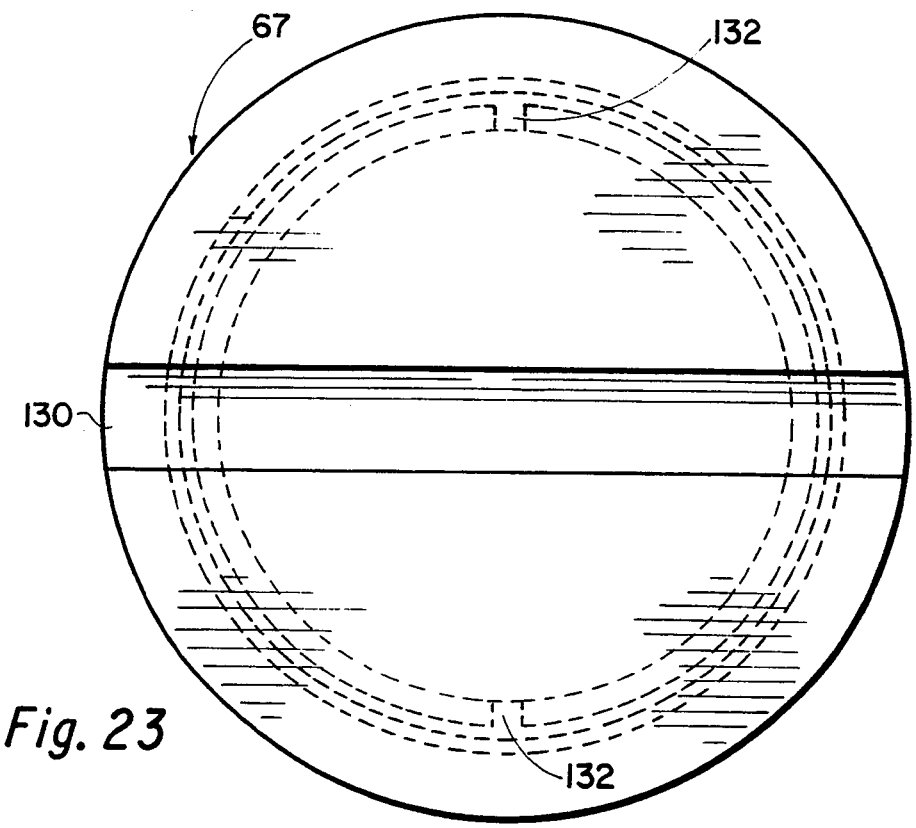
FIG. 23 is a top view of second lid member 67.
Figure 22:
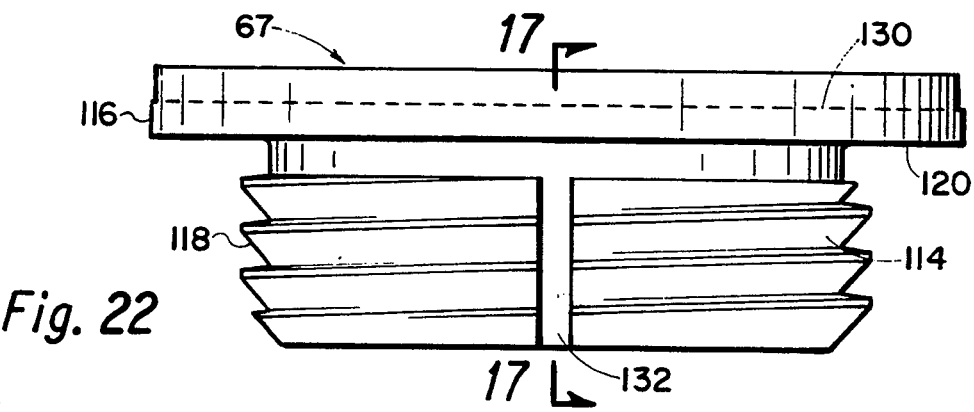
FIG. 22 is a side view of second lid member 67.
Figure 21:
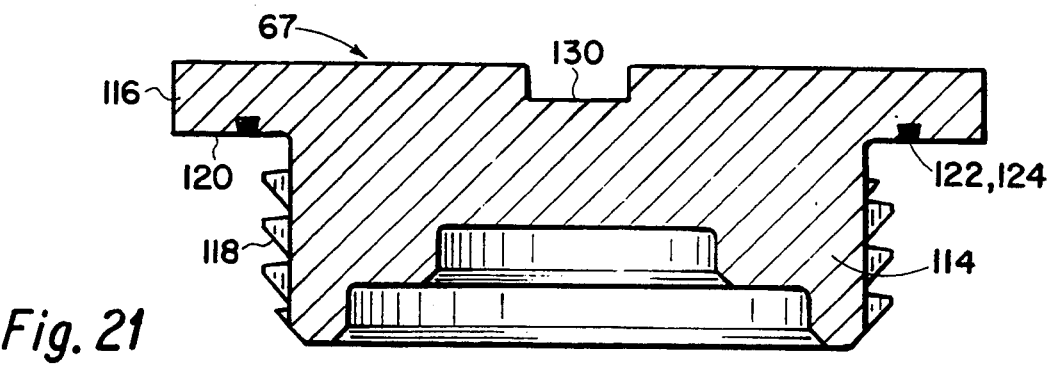
FIG. 21 is a cutaway side view of an alternate second lid member 67 for hatch apparatus 60.

In another embodiment, the second lid member used in conjunction with inventive hatch apparatus 60 is second lid member 67 depicted in FIGS. 21-23. Second lid member 67 comprises: a lower cylindrical portion 114; a male threaded portion 118 formed around lower cylindrical portion 114; and an upper portion 116 adjacent the axial upper end of lower cylindrical portion 114 and having a radial lower surface 120 extending outwardly from the axial upper end of lower cylindrical portion 114. As was the case with lid member 66, second lid member 67 can also include a locking arrangement identical to that of lid 6 comprising: an outward extension of upper portion 116 having an aperture extending therethrough; a locking pin; and a locking pin spring.

Male threaded portion 118 of second lid member 67 is receivable in second threaded cylindrical bore 86 of first lid member 64 whereby lid member 67 can be threadedly connected to lid member 64. When male threaded portion 118 is completely received in second threaded bore 86, lower radial surface 120 of lid member 67 abuts radial upper surface 100 of lid member 64. An 0-ring 122 is preferably provided in a groove 124 formed in lower radial surface 120 for sealing the threaded connection between lid member 67 and lid member 64. As indicated in FIG. 21, the interior sides of groove 124 preferably diverge such that the base of groove 124 is larger than the opening of groove 124.

As further indicated in FIGS. 21-23, a slot 130 is preferably formed in the top of second lid member 67. Slot 130 preferably has a rectangular cross section such that a rod, or other member, having a rectangular cross-sectional shape corresponding to that of slot 130 can be placed in slot 130 and used for connecting second lid member 67 to, and disconnecting second lid member 67 from, first lid member 64.

When second lid member 67 is used, inventive hatch apparatus 60 also preferably includes a second safety vent means for relieving pressure buildup inside container 10 as second lid member 67 is removed from first lid member 64. This second safety vent means can include at least one vent groove formed across either second threaded bore 86 of first lid member 64 or male threaded portion 118 of second lid member 67. Most preferably, the second safety vent means includes two vent grooves 132 formed across male threaded portion 118 of second lid member 67.

As will also be apparent to those skilled in the art, a lid member substantially identical to second lid member 67 could also be used in inventive hatch apparatus 2 as a substitute for lid members 6 and 7.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A hatch apparatus for a container having a container opening defined therein with a container flange surrounding said container opening, comprising:
    a non-metallic base comprising: a collar having a passageway extending therethrough; a threaded cylindrical bore defining at least a portion of said passageway, said threaded cylindrical bore having an inside diameter $D_1$; and a base flange connected to said collar, said base flange having an inside diameter $D_3$ and said base flange being complementary to said container flange such that said base flange can be sealingly bolted to said container flange and
    a non-metallic lid including a male threaded portion threadedly receivable in said threaded cylindrical bore,
    wherein the radial thickness of said collar is substantially greater than the thickness of the connection between said collar and said base flange and the inside diameter $D_3$ of said base flange is substantially greater than the inside diameter $D_1$ of said threaded cylindrical bore such that, when said container flange is an uneven container flange, said base flange can be sealingly bolted to said container flange without causing said threaded cylindrical bore to be pulled substantially out-of-round.

2. A hatch apparatus as described in claim 1 wherein:
    said collar further comprises a cylindrical exterior surface having an outside diameter $D_2$;
    said inside diameter $D_1$ of said threaded cylindrical bore is not greater than about 75% of said outside diameter $D_2$ of said cylindrical exterior surface; and
    said inside diameter $D_1$ of said threaded cylindrical bore is not greater than about 85% of said inside diameter $D_3$ of said base flange.

3. A hatch apparatus as described in claim 2 wherein:
    said base flange has a lower radial surface which is positionable adjacent said container flange;

said base flange has an upper radial surface which is substantially parallel to said lower radial surface; and said base flange has a thickness $Y_2$ defined by the distance between said lower radial surface and said upper radial surface of not greater than about 1.5 inches.

4. A hatch apparatus as described in claim 3 wherein:

said inside diameter $D_1$ of said threaded cylindrical bore is in the range of from about 60% to about 70% of said outside diameter $D_2$ of said cylindrical exterior surface and said inside diameter $D_1$ of said threaded cylindrical bore is in the range of from about 68% to about 78% of said inside diameter $D_3$ of said base flange.

5. A hatch apparatus as described in claim 4 wherein:

said threaded cylindrical bore has an upper longitudinal end and a lower longitudinal end;

said base further comprises a second cylindrical bore adjacent said lower longitudinal end of said threaded cylindrical bore and extending into said flange, the inside diameter of said second cylindrical bore being said inside diameter $D_3$ of said base flange;

said base further comprises an interior radial surface defined by the transition from said threaded cylindrical bore to said second cylindrical bore;

said interior radial surface lies in a first plane;

said upper radial surface of said base flange lies in a second plane substantially parallel to said first plane; and said first plane is vertically spaced above said second plane.

6. A hatch apparatus as described in claim 5 wherein said first plane is vertically spaced above said second plane by a distance $Y_1$ in the range of from about 0.1 to about 0.75 inches.

7. A hatch apparatus as described in claim 5 wherein said thickness $Y_2$ of said base flange is not greater than about 1.0 inches.

8. A hatch apparatus as described in claim 1 wherein:

said lid has a lid passageway extending therethrough and said male threaded portion surrounds at least a portion of said lid passageway such that, when said male threaded portion is received in said threaded cylindrical bore of said base, said lid passageway is placed in communication with said passageway of said collar and said hatch apparatus further comprises a relief means, associatable with said lid passageway, for relieving a pressure differential between the interior and the exterior of said container.

9. A hatch apparatus as described in claim 8 further comprising a sealing means positionable between said base and said lid.

10. A hatch apparatus as described in claim 9 wherein said sealing means is an O-ring.

11. A hatch apparatus as described in claim 8 wherein said lid further includes a female threaded portion inside said lid passageway for associating said pressure relief means with said lid passageway.

12. A hatch apparatus as described in claim 11 wherein said pressure relief means is a pressure relief valve.

13. A hatch apparatus as described in claim 1 further comprising a safety vent means for releasing pressure in said container when said male threaded portion of said lid is being removed from said threaded cylindrical bore of said base.

14. A hatch apparatus as described in claim 13 wherein said safety vent means includes at least one safety vent groove defined across said male threaded portion of said lid.

15. A hatch apparatus as described in claim 1 wherein:

said collar has an upper radial surface and said lid further comprises a radial surface complementary to said upper radial surface of said base such that said radial surface of said lid abuts said upper radial surface of said base when said male threaded portion of said lid is received in said threaded cylindrical bore of said base.

16. A hatch apparatus as described in claim 15 further comprising an O-ring seal positionable between said upper radial surface of said base and said radial surface of said lid in a groove provided in one of said upper radial surface of said base and said radial surface of said lid.

17. A hatch apparatus as described in claim 1 wherein said lid includes at least one tool groove integrally formed thereon.

18. A hatch apparatus as described in claim 1 wherein said base and said lid are formed from ultra-high molecular weight polyethylene.

19. A hatch apparatus as described in claim 1 further comprising a locking means for preventing said lid from being threadedly disconnected from said base.

20. A hatch apparatus for a container having a container opening defined therein with a container flange surrounding said container opening, comprising:

a non-metallic base connectable to said container flange by bolting, said base having a base passageway extending therethrough such that, when said base is connected to said container flange, said base passageway is placed in communication with said container opening, said base further including (a) a female threaded portion inside said base passageway, (b) a cylindrical collar having said base passageway extending longitudinally therethrough, said cylindrical collar having an axial first end and an axial second end, (c) an upper radial surface at said axial second end of said cylindrical collar, and (d) a groove provided in said upper radial surface of said base;

a non-metallic lid including a male threaded portion threadedly receivable in said female threaded portion of said base, said lid having a radial surface complementary to said upper radial surface of said base such that said radial surface of said lid abuts said upper radial surface of said base when said male threaded portion of said base; and a pin reciprocatably projecting from said radial surface of said lid, said pin being receivable in said groove such that when said pin is positioned in said groove said lid is prevented from being threadedly disconnected from said base.

21. A hatch apparatus as described in claim 20 further comprising a sealing means positionable between said base and said lid.

22. A hatch apparatus as described in claim 21 wherein said sealing means is an O-ring.

23. A hatch apparatus as described in claim 20 wherein:

said lid includes a lid passageway extending therethrough and said male threaded portion of said lid surrounds at least a portion of said lid passageway such that, when said male threaded portion of said lid is received in said female threaded portion of said base, said lid passageway is placed in communication with said base passageway;

said apparatus further comprises pressure relief means, associatable with said lid passageway, for relieving a pressure differential between the interior and the exterior of said container; and said lid further includes a female threaded portion inside said lid passageway for associating said pressure relief means with said lid passageway.

24. A hatch apparatus as described in claim 23 wherein said pressure relief means is a pressure relief valve.

25. A hatch apparatus as described in claim 24 further comprising a conduit means connectable between said female threaded portion of said lid and said pressure relief valve.

26. A hatch apparatus as described in claim 20 wherein said lid includes at least one safety vent groove defined across said male threaded portion of said lid.

27. A hatch apparatus as described in claim 20 wherein said base further comprises a base flange adjacent said axial first end, said base flange being complementary to said container flange such that said base flange can be bolted to said container flange.

28. A hatch apparatus as described in claim 27 further comprising an O-ring seal positionable between said upper radial surface of said base and said radial surface of said lid in a groove provided in one of said upper radial surface of said base and said radial surface of said lid.

29. A hatch apparatus as described in claim 20 wherein said base and said lid are formed from ultrahigh molecular weight polyethylene.

* * * * *